United States Patent
Meyer et al.

(10) Patent No.: US 10,106,148 B2
(45) Date of Patent: Oct. 23, 2018

(54) ELECTRIC MACHINE TORQUE CONTROL DURING TRANSIENT PHASE OF BYPASS CLUTCH

(71) Applicant: Ford Global Technologies, LLC, Dearborn, MI (US)

(72) Inventors: Jason Meyer, Canton, MI (US); Rajit Johri, Canton, MI (US); Mark Steven Yamazaki, Canton, MI (US); Bernard D. Nefcy, Novi, MI (US); Jeffrey Allen Doering, Canton, MI (US); Scott James Thompson, Canton, MI (US); Daniel Scott Colvin, Farmington Hills, MI (US); Scott Steadmon Thompson, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/241,971

(22) Filed: Aug. 19, 2016

(65) Prior Publication Data

US 2018/0050684 A1   Feb. 22, 2018

(51) Int. Cl.
*B60W 20/20* (2016.01)
*B60K 6/48* (2007.10)
(Continued)

(52) U.S. Cl.
CPC ............. *B60W 20/20* (2013.01); *B60K 6/48* (2013.01); *B60W 10/06* (2013.01); *B60W 10/08* (2013.01);
(Continued)

(58) Field of Classification Search
None
See application file for complete search history.

(56) References Cited

U.S. PATENT DOCUMENTS

| 5,121,820 A | 6/1992 | Brown et al. |
| 6,364,807 B1 | 4/2002 | Koneda et al. |

(Continued)

FOREIGN PATENT DOCUMENTS

| JP | 5287780 B2 | 9/2013 |
| KR | 1020050098681 A | 12/2005 |

*Primary Examiner* — Mussa A Shaawat
*Assistant Examiner* — Kyung J Kim
(74) *Attorney, Agent, or Firm* — David B. Kelley; Brooks Kushman P.C.

(57) ABSTRACT

A vehicle includes an engine having a crankshaft, a transmission, an electric machine, and at least one controller. The transmission includes a torque converter having a turbine fixed to a turbine shaft that is driveably connected to driven wheels of the vehicle. The torque converter includes an impeller and a bypass clutch configured to selectively lock the impeller and the turbine relative to each other. The electric machine includes a rotor selectively coupled to the crankshaft via a disconnect clutch and fixed to the impeller. The at least one controller is configured to generate a first torque command for the electric machine that defines a magnitude equal to driver-demanded torque while the bypass clutch is locked. The controller is further configured to, in response to a reduction in fluid pressure supplied to the bypass clutch, generate a second torque command for the electric machine that defines a magnitude equal to driver-demanded torque plus impeller inertia torque.

20 Claims, 4 Drawing Sheets

(51) Int. Cl.
   *B60W 10/06*    (2006.01)
   *B60W 10/08*    (2006.01)
   *B60W 20/15*    (2016.01)

(52) U.S. Cl.
   CPC ..... *B60W 20/15* (2016.01); *B60K 2006/4825* (2013.01); *B60W 2510/0208* (2013.01); *B60W 2510/0275* (2013.01); *B60W 2710/083* (2013.01); *Y10S 903/903* (2013.01)

(56) References Cited

U.S. PATENT DOCUMENTS

| | | | |
|---|---|---|---|
| 7,070,530 | B2 | 7/2006 | Ai et al. |
| 7,743,678 | B2 | 6/2010 | Wittkopp et al. |
| 7,758,467 | B2 | 7/2010 | Ashizawa et al. |
| 7,896,114 | B2 | 3/2011 | Colvin et al. |
| 7,909,730 | B2 | 3/2011 | Schwarz et al. |
| 8,315,752 | B2 | 11/2012 | Kwon et al. |
| 8,571,771 | B2 | 10/2013 | Kresse |
| 8,602,939 | B2 | 12/2013 | Yamazaki et al. |
| 8,715,136 | B1 | 5/2014 | Dai et al. |
| 8,911,324 | B2 | 12/2014 | Doering |
| 9,031,722 | B2 | 5/2015 | Doering et al. |
| 9,067,594 | B2 | 6/2015 | Wang et al. |
| 2002/0170758 | A1 | 11/2002 | Shimabukuro et al. |
| 2003/0229429 | A1 | 12/2003 | Brown et al. |
| 2006/0089232 | A1 | 4/2006 | Kobayashi et al. |
| 2007/0056784 | A1 | 3/2007 | Joe et al. |
| 2007/0191181 | A1 | 8/2007 | Burns |
| 2008/0119975 | A1 | 5/2008 | Yamazaki et al. |
| 2009/0093339 | A1* | 4/2009 | Chen ............... F16H 61/143 477/61 |
| 2009/0143950 | A1* | 6/2009 | Hasegawa ............ B60K 6/48 701/68 |
| 2009/0194381 | A1 | 8/2009 | Samie et al. |
| 2010/0087290 | A1 | 4/2010 | Schoenek et al. |
| 2011/0061954 | A1 | 3/2011 | Singh et al. |
| 2011/0118915 | A1 | 5/2011 | Ortmann et al. |
| 2011/0165992 | A1 | 7/2011 | Ueno et al. |
| 2011/0245034 | A1 | 10/2011 | Yoshida et al. |
| 2013/0012353 | A1 | 1/2013 | Yoshida et al. |
| 2013/0023380 | A1 | 1/2013 | Sah |
| 2013/0274969 | A1 | 10/2013 | Wang et al. |
| 2013/0291830 | A1 | 11/2013 | Doering et al. |
| 2013/0296108 | A1 | 11/2013 | Ortmann et al. |
| 2013/0296119 | A1 | 11/2013 | Reed |
| 2013/0296123 | A1 | 11/2013 | Doering |
| 2013/0297162 | A1* | 11/2013 | Dai ............... B60W 20/30 701/55 |
| 2015/0111693 | A1 | 4/2015 | Wang et al. |
| 2015/0198243 | A1 | 7/2015 | Johri et al. |
| 2015/0274172 | A1 | 10/2015 | Yamanaka et al. |
| 2016/0031431 | A1 | 2/2016 | Johri et al. |

\* cited by examiner

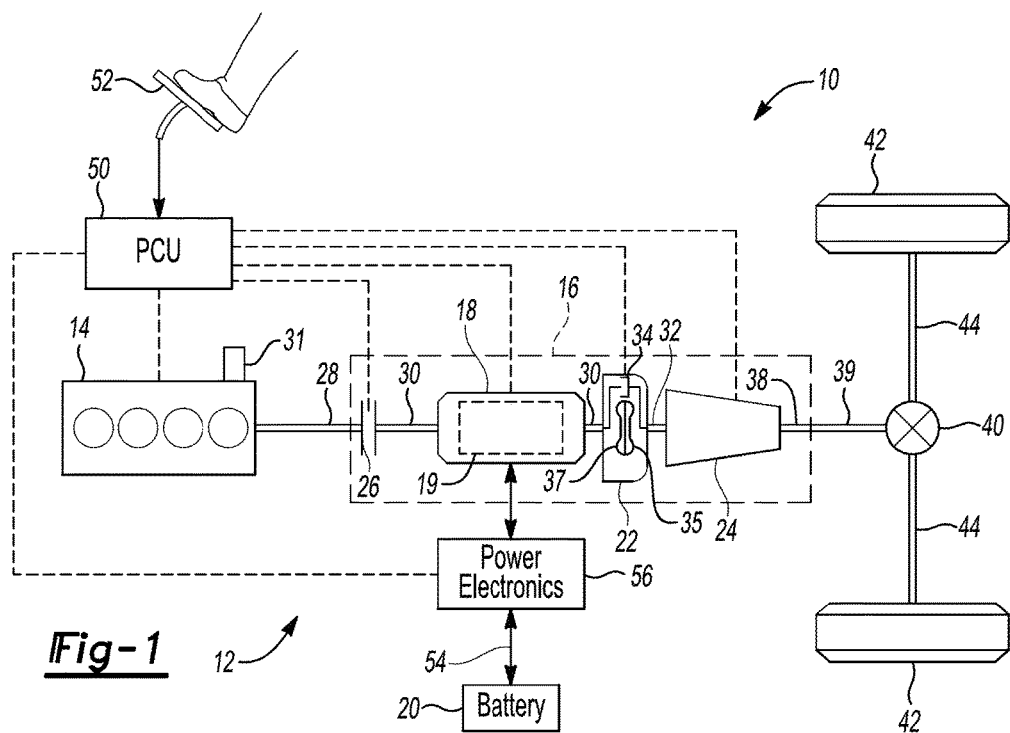
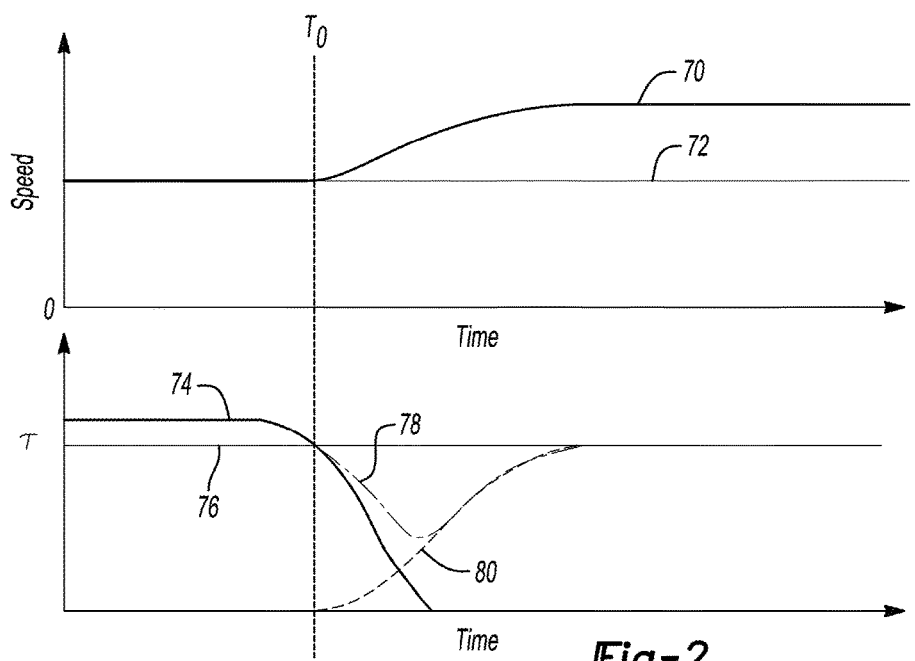

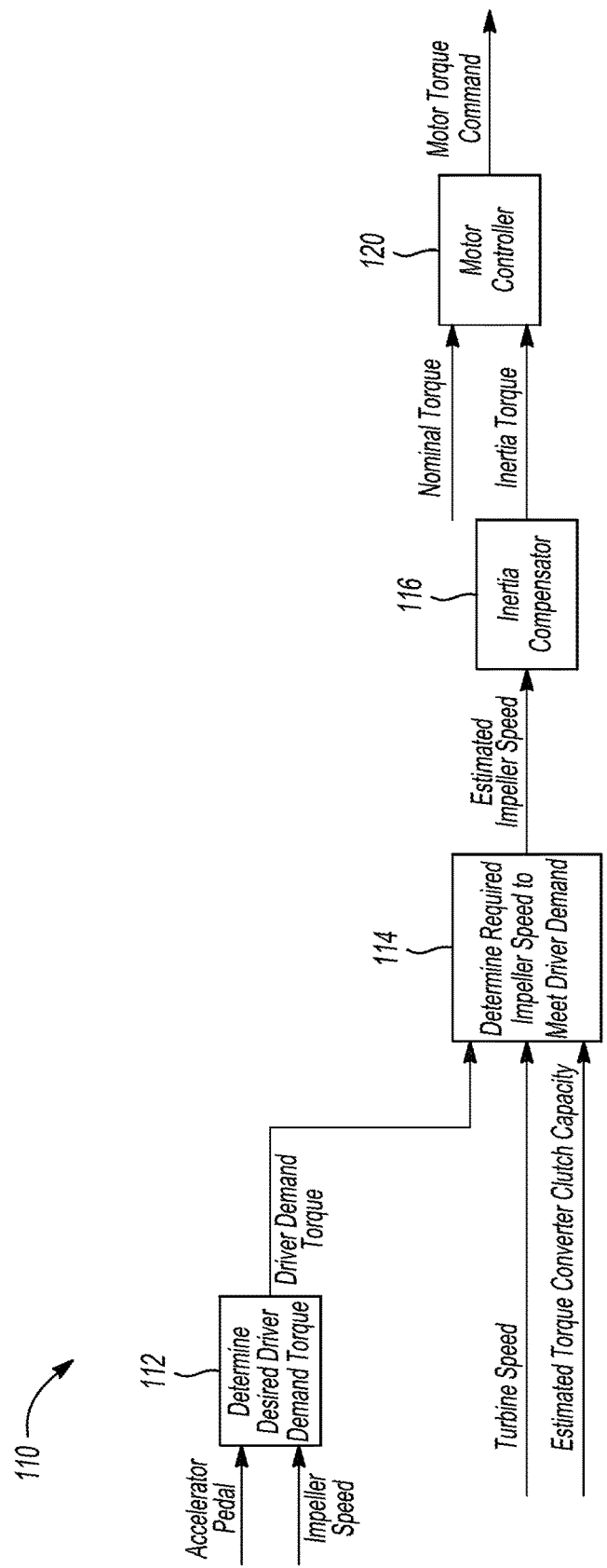

ELECTRIC MACHINE TORQUE CONTROL DURING TRANSIENT PHASE OF BYPASS CLUTCH

TECHNICAL FIELD

The present disclosure relates to hybrid-electric vehicles and more specifically to controlling an electric machine during opening and closing of a bypass clutch of a torque converter.

BACKGROUND

A hybrid-electric powertrain includes an engine and an electric machine. The torque (or power) produced by the engine and/or the electric machine can be transferred through a transmission to the driven wheels to propel the vehicle. A traction battery supplies energy to the electric machine.

SUMMARY

According to one embodiment, a vehicle includes an engine having a crankshaft, a transmission, an electric machine, and at least one controller. The transmission includes a torque converter having a turbine fixed to a turbine shaft that is driveably connected to driven wheels of the vehicle. The torque converter includes an impeller and a bypass clutch configured to selectively lock the impeller and the turbine relative to each other. The electric machine includes a rotor selectively coupled to the crankshaft via a disconnect clutch and fixed to the impeller. The at least one controller is configured to generate a first torque command for the electric machine that defines a magnitude equal to driver-demanded torque while the bypass clutch is locked. The controller is further configured to, in response to a reduction in fluid pressure supplied to the bypass clutch, generate a second torque command for the electric machine that defines a magnitude equal to driver-demanded torque plus impeller inertia torque.

According to another embodiment, a hybrid powertrain includes an engine and a motor selectively coupled to the engine. A transmission includes a torque converter having an impeller and a turbine selectively fixed to each other via a bypass clutch. A controller is configured to, in response to a reduction in torque capacity of the bypass clutch, increase a torque command to the motor by a magnitude equal to an inertia torque of the impeller during the reduction in torque capacity.

According to yet another embodiment, a method of controlling motor torque in a hybrid vehicle is presented. The vehicle has an engine, a motor, and a torque converter with a bypass clutch that selectively locks an impeller to a turbine. The method includes generating a motor torque at a first magnitude when the bypass clutch is locked. The method further includes, in response to a decrease in torque capacity of the bypass clutch, generating a motor torque at a second magnitude until the torque capacity approximates zero. The difference between the second magnitude and the first magnitude approximates an inertia torque of the impeller during the decrease in torque capacity.

BRIEF DESCRIPTION OF THE DRAWINGS

FIG. 1 is a schematic diagram of an example hybrid-electric vehicle.

FIG. 2 shows variations of the powertrain parameters during an engine start in which the commanded electric-machine torque is based on a driver-demanded torque.

FIG. 4 is a control diagram illustrating an algorithm for controlling the electric machine.

DETAILED DESCRIPTION

Figure 3:
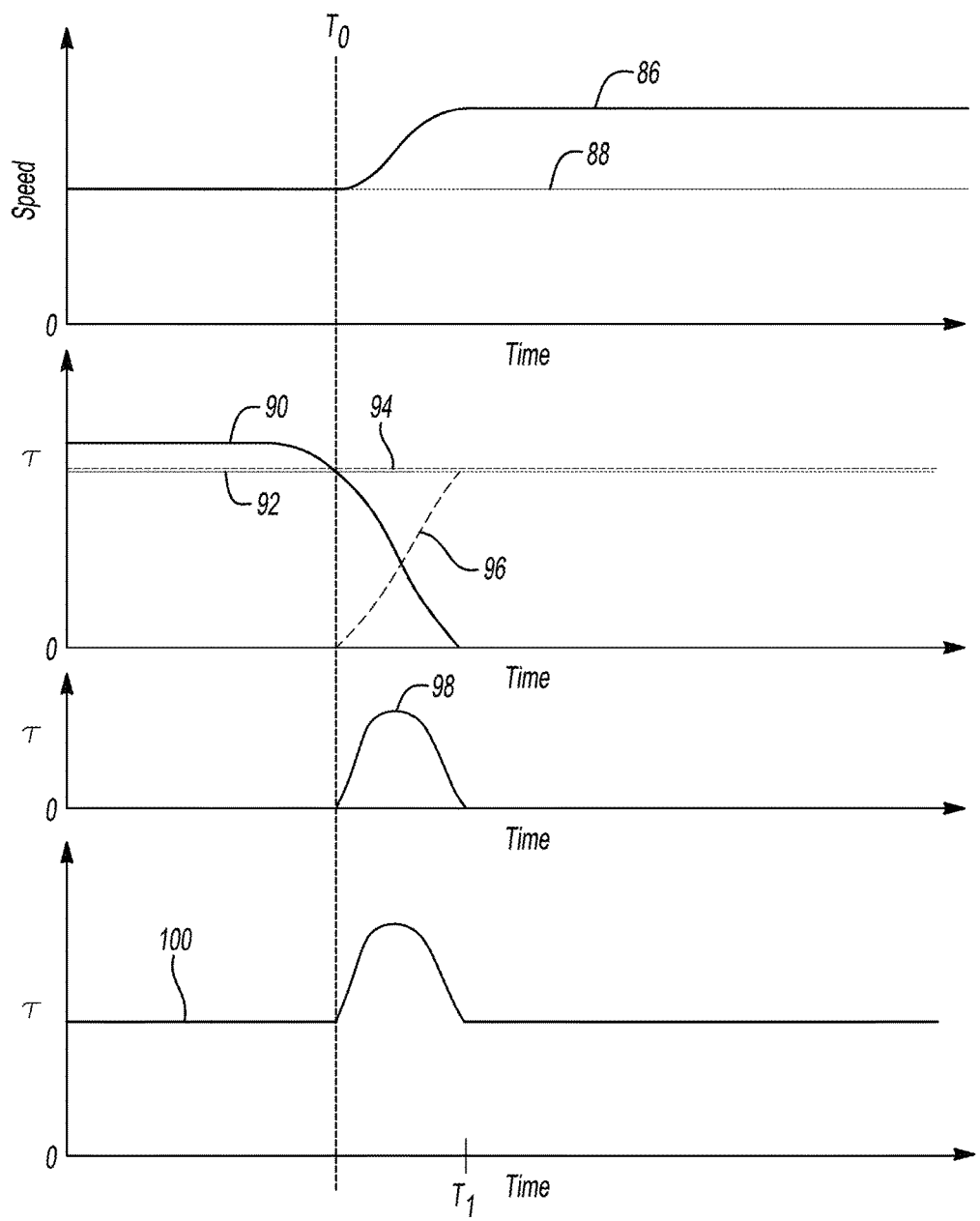
FIG. 3 shows variations of the powertrain parameters during an engine start in which the commanded electric-machine torque is based on a driver-demanded torque and an inertia torque of the impeller.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIG. 1, a schematic diagram of a hybrid-electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12 having an engine 14 that drives a transmission 16, which may be referred to as a modular-hybrid transmission (MHT). As will be described in further detail below, a transmission 16 includes an electric machine such as an electric motor/generator (M/G) 18, an associated traction battery 20, a torque converter 22, and a multiple step-ratio automatic transmission, or gearbox 24. The M/G may also be referred to as the motor 18.

The engine 14 and the M/G 18 are both drive sources for the HEV 10. The engine 14 generally represents a power source that may include an internal-combustion engine such as a gasoline, diesel, or natural gas powered engine, or a fuel cell. The engine 14 generates an engine power and corresponding engine torque that is supplied to the M/G 18 when a disconnect clutch (KO clutch) 26 between the engine 14 and the M/G 18 is at least partially engaged. The M/G 18 may be implemented by any one of a plurality of types of electric machines. For example, M/G 18 may be a permanent-magnet-synchronous motor. Power electronics 56 condition direct current (DC) provided by the battery 20 to the requirements of the M/G 18, as will be described below. For example, power electronics may provide three-phase alternating current (AC) to the M/G 18.

When the disconnect clutch 26 is at least partially engaged, power flows from the engine 14 to the M/G 18.

Power flow from the M/G 18 to the engine 14 is also possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. The shaft 30 extends through the M/G 18. The rotor 19 of the M/G 18 is fixed on the shaft 30, whereas the engine 14 is selectively driveably connected to the shaft 30 only when the disconnect clutch 26 is at least partially engaged.

A separate starter motor 31 can be selectively engaged with the engine 14 to rotate the engine to allow combustion to begin. The starter motor 31 may be powered by a 12-volt system of the vehicle. Once the engine is started, the starter motor 31 can be disengaged from the engine via, for example, a solenoid that engages/disengages a pinion gear with the ring gear on the flywheel (not shown). In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine to the M/G to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is driveably connected to the torque converter 22 via the shaft 30. For example, the torque-converter housing may be fastened to the shaft 30. The torque converter 22 is therefore driveably connected to the engine 14 when the disconnect clutch 26 is at least partially engaged. Two components are driveably connected if they are connected by a power flow path that constrains their rotational speeds to be directly proportional. The torque converter 22 includes an impeller 35 fixed to the torque-converter housing (and consequently, fixed to the rotor 19) and a turbine 37 fixed to a transmission input shaft 32 that is driveably connected to the driven wheels 42. The torque converter 22 provides a hydraulic coupling between the shaft 30 and the transmission input shaft 32. The torque converter 22 transmits power from the impeller 35 to the turbine 37 when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may be provided to, when engaged, frictionally or mechanically couple the impeller and the turbine of the torque converter 22, permitting more efficient power transfer. The torque converter bypass clutch 34 may be operated as a launch clutch to provide smooth vehicle launch. The bypass clutch 34 may be a wet-friction clutch controlled by fluid pressure supplied by the transmission pump or an auxiliary pump. The disks of the clutch frictionally engage to transfer torque through the bypass clutch when fluid pressure reaches a threshold value. In some applications, the disconnect clutch 26 is generally referred to as an upstream clutch and bypass clutch 34 is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 32. The gearbox 24 is automatically shifted from one ratio to another based on various vehicle and ambient operating conditions by an associated controller, such as a powertrain-control unit (PCU) 50. The gearbox 24 then provides powertrain output torque to output shaft 38. The output shaft 38 may be connected to a driveline 39 (e.g., a driveshaft and universal joints) that connects the output shaft 38 to the differential 40.

It should be understood that the hydraulically controlled gearbox 24 used with a torque converter 22 is but one example of a gearbox or transmission arrangement; any multiple-ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 38 may be connected to a driveline 39 that connects the output shaft 38 to the differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

While illustrated as one controller, the controller 50 may be part of a larger control system and may be controlled by various other controllers throughout the vehicle 10, such as a vehicle-system controller (VSC) and a high-voltage battery controller (BECM). It is to be understood that the powertrain-control unit 50 and one or more other controllers can collectively be referred to as a "controller" that controls various actuators in response to signals from various sensors to control functions such as starting/stopping engine 14, operating M/G 18 to provide wheel torque or charge the battery 20, select or schedule transmission shifts, etc. The controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine, traction battery, transmission, or other vehicle systems.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller 50 may communicate signals to and/or from the engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air-conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure (if applicable), crankshaft position (PIP), engine rotational speed (RPM), wheel speeds (WS1, WS2), vehicle speed (VSS), coolant temperature (ECT), intake-manifold pressure (MAP), accelerator-pedal position (PPS), ignition-switch position (IGN), throttle-valve position (TP), air temperature (TMP), exhaust-gas oxygen (EGO) or other exhaust gas component concentration or presence, intake-air flow (MAF), transmission gear, ratio, or mode, transmission-oil temperature (TOT), transmission-turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. The pedal 52 may include a pedal-position sensor. In general, depressing and releasing the pedal 52 causes the pedal sensor to generate an accelerator-pedal-position signal that may be interpreted by the controller 50 as a demand for increased power or decreased power, respectively. Based at least upon input from the pedal, the controller 50 commands torque from the engine 14 and/or the M/G 18. The controller 50 also controls the timing of the gear shifts within the gearbox 24, as well as engagement or disengagement of the disconnect clutch 26 and the torque converter bypass clutch 34. Like the disconnect clutch 26, the bypass clutch 34 can be modulated across a range between the engaged and disengaged positions. This produces a variable slip in the torque converter 22 in addition to the variable slip produced by the hydrodynamic coupling between the impeller and the turbine. Alternatively, the bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as "hybrid mode," "engine-motor mode," or "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter and a DC/DC converter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive (e.g. drive) or negative (e.g. regenerative) torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely an example and is not intended to be limiting. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

The vehicle-control system (which includes the controller 50) determines a driver-demanded torque based on signals from a pedal-position sensor associated with the accelerator pedal 52. This torque may be delivered by placing the powerplants (e.g., the engine and M/G) in torque control. In torque control, the controller determines a torque split between the engine and the motor and commands that torque from each of the powerplants.

The one or more of the powerplants (and especially the M/G) may also be controlled using speed control. In speed control, the controller sets a target motor speed and measures the speed of the motor. The controller compares these speeds and outputs a torque request to the motor based on an error between these speeds. The controller may use a model of the torque converter to determine a target speed for the motor.

The torque converter bypass clutch 34 physically locks the impeller to the turbine to increase efficiency of the torque converter by eliminating fluid losses associated with the fluid torque path of the torque converter. When the bypass clutch is locked, the actuators (e.g., the engine and M/G) and the driven wheels are fixed to each other. Disturbances from the actuators can propagate though the driveline to the driven wheels. These disturbances may cause instantaneous acceleration or deceleration of the vehicle, which the driver feels as jerks, hesitations, or other unexpected behavior. The fluid connection between the impeller and the turbine acts as a natural dampener to isolate the actuators from the driven wheels. When the bypass clutch is at least slipping, disturbances from the actuators are absorbed by the fluid torque path. To take advantage of the dampening effect of the torque converter, the bypass clutch can be at least partially opened during events having a high probability of producing driveline disturbances. For example, the bypass clutch may be closed during steady-state driving and open or slipping during dynamic vehicle events such as hard acceleration, gear shifts, and engine starting.

When the bypass clutch transitions from a locked state to a slipping state, the amount of torque transmitted to the driven wheels decreases, and the load on the impeller decreases causing the impeller speed to increase. This creates a torque hole, which if unmitigated, can create driveline disturbances noticeable by the driver. Similarly, when the bypass clutch transitions from a slipping state to a locked state, a torque surplus is created that can create driveline disturbances.

Referring to FIG. 2, an example sequence of operations for a hybrid vehicle is shown to illustrate example effects of unmitigated torque hole. Prior to time $T_0$, the torque converter bypass clutch is fully closed and the driver-demanded torque 76 is a constant, nonzero value. When the bypass clutch is fully closed, the impeller speed 70 and the turbine speed 72 match. At time $T_0$, the controller has scheduled a dynamic operation (e.g., engine start or shifting gears) in which the bypass clutch is to be fully opened. The clutch capacity 74 of the bypass clutch begins reducing just prior to time $T_0$ in anticipation of the bypass clutch being opened. At time $T_0$ the clutch begins to slip and the impeller speed 70 begins to increase. The slip between the impeller and the turbine creates a fluid torque 80, which begins to increate at time $T_0$. Because the fluid torque 80 is not increasing as fast as the clutch torque 74 is decreasing, the net impeller torque 78 dips below the driver-demanded torque. This causes a torque hole that is detectable by the driver. Accelerating the impeller requires a corresponding impeller inertia torque. The amplitude of the wheel torque hole is proportional to this inertia torque.

In the example of FIG. 2, the torque output of the actuators remained constant at the constant driver-demanded torque. In the following example of FIG. 3, the torque output of at least one of the actuators is increased above the driver-demand torque to mitigate the effects of transitioning between the locked and unlocked states of the bypass clutch.

Referring to FIG. 3, prior to time $T_0$ the bypass clutch is fully closed and the impeller speed 86 and the turbine speed 88 are equal to each other. Throughout this example, the driver-demanded torque 92 is a constant, nonzero value. At time $T_0$, the controller has scheduled a dynamic operation (e.g., engine start or shifting gears) in which the bypass clutch is to be fully opened. The clutch capacity 90 of the bypass clutch starts being reduced just prior to time $T_0$ in anticipation of opening the bypass clutch. At time $T_0$, the clutch begins to slip and the impeller speed 86 begins to increase and diverge from the turbine speed 88. The slip between the impeller and the turbine creates a fluid torque 96, which begins to increase at time $T_0$. Accelerating the impeller requires a corresponding impeller inertia torque 98. Unlike FIG. 2, in which the actuator output remained constant, the actuator torque 100 increases between time $T_0$ and time $T_1$ to compensate for inertia torque and prevent a the torque hole. The increased torque may be equal to the inertia torque 98. Therefore, the actuator torque 100 has a magnitude equal to the driver-demanded torque plus the inertia torque between times $T_0$ and $T_1$. By doing this, the net impeller torque 94 continues to approximate the driver-demanded torque 92 during times $T_0$ to $T_1$, unlike the example of FIG. 2, where the net impeller torque 78 dropped. In one embodiment, the increased torque is supplied by the M/G 18.

Adding the impeller inertia torque 98 to the actuator torque command not only prevents a dip in net impeller torque, it also reduces the time required for the fluid torque path of the torque converter to stabilize, which occurs at time $T_1$. Comparing FIGS. 2 and 3, the fluid torque stabilized 200 milliseconds faster in FIG. 3 than in FIG. 2 due to the additional actuator torque. FIG. 3 describes an example in which the bypass clutch is fully open, however, the controls of this disclosure can be performed whenever the bypass clutch capacity is below the impeller torque (e.g., bypass clutch is slipping).

In this example, the controller generated a sequence of three separate actuator-torque commands. A first torque command was issued prior to $T_0$, a second torque command was generated between times $T_0$ and $T_1$, and a third torque command was generated after $T_1$. The first torque command is prior to the transient phase of the bypass clutch and has a magnitude equal to the driver-demanded torque. The second torque command is during the transient phase and has a magnitude equal to the driver-demanded torque plus the inertia torque. The second torque command is reduced to the driver-demanded torque at time $T_1$ because the inertia torque of the impeller converges to zero when the fluid torque path stabilizes. Thus, at time $T_1$, the controller generates the third torque command having a magnitude equal to the driver-demanded torque.

As the torque converter capacity is reduced, the amount of steady-state torque converter slip (and thus impeller speed) can be predicted using a model of the torque converter. This speed corresponds to the speed required to keep the delivered turbine torque (wheel torque) constant. If the actuator torque is held constant, then the actual impeller speed will lag behind this speed, as shown by FIG. 2. The vehicle control system can ensure that the system-delivered torque is constant by increasing the net torque produced by the actuators to compensate for the inertia torque needed to create the required torque converter slip, as shown in FIG. 3. This torque can be calculated from the turbine speed and the model-estimated required impeller speed. Alternatively, vehicle controls could actively control impeller speed to the required impeller speed using speed control. The speed control could consider the same inertia torque as a feedforward term.

FIG. 4 illustrates controls 110 for controlling motor torque during opening or closing of the torque converter bypass clutch. The controls begin by determining the driver-demanded torque at box 112. The driver-demanded torque could be the driver-demanded torque at the impeller or the driver-demanded torque at the turbine. In this example, the driver-demanded torque will be at the impeller. The driver-demanded torque is based on the accelerator pedal position and the impeller speed. Using these inputs, control logic within box 112 outputs the driver-demanded torque to box 114. A measured turbine speed, and an estimated torque converter clutch capacity are also fed into box 114. Control logic within box 114 calculates a desired impeller speed to meet the driver-demanded torque based on the driver-demanded torque, the turbine speed, and the estimated clutch capacity. The desired fluid torque may be set to the driver-demanded impeller torque minus the estimated torque converter clutch capacity. The desired impeller speed may be calculated using the torque converter model. The torque converter fluid torque ($\tau_{fluid}$) can be related to the impeller speed $\omega_I$ and a scaling factor K which is a function of turbine speed and impeller speed.

$$\tau_{fluid} = K(\omega_I)^2 \quad \text{(Eq. 1)}$$

The desired impeller speed from box 114 is fed into box 116. Box 116 has a finite value when a state of the bypass clutch is changing and is zero when the bypass clutch is steady state. Logic within box 116 calculates an inertia torque required to achieve the desired impeller speed. This can be calculated using equation 1, where $\omega_I$ is the speed of the impeller and I is the inertia of the impeller.

$$\text{Inertia torque} = \frac{d\omega_I}{dt} \times I \quad \text{(Eq. 2)}$$

The inertia torque and a nominal torque are fed into box 120, which generates the motor-torque command. The nominal torque is equal to the driver-demanded torque when the driver-demanded torque is at the impeller. If the driver-demanded torque is at the turbine, then the nominal torque is equal to the driver-demanded torque at the turbine divided by a ratio of the torque converter. If the engine is connected to the torque converter, the nominal torque is equal to the driver-demanded torque minus the estimated engine torque.

Logic within box 120 combines the inertia torque to the driver-demanded torque and outputs a commanded motor that includes a magnitude equal to the driver-demanded torque plus or minus the inertia torque depending upon if the bypass clutch is transitioning from locked to slipping, or slipping to locked. The inertia torque is added to the driver-demanded torque to compensate for torque hole when the bypass clutch is transitioning from locked to slipping, and is subtracted from the driver-demanded torque to compensate for torque surplus when the clutch is transitioning from slipping to locked.

Figure 5:
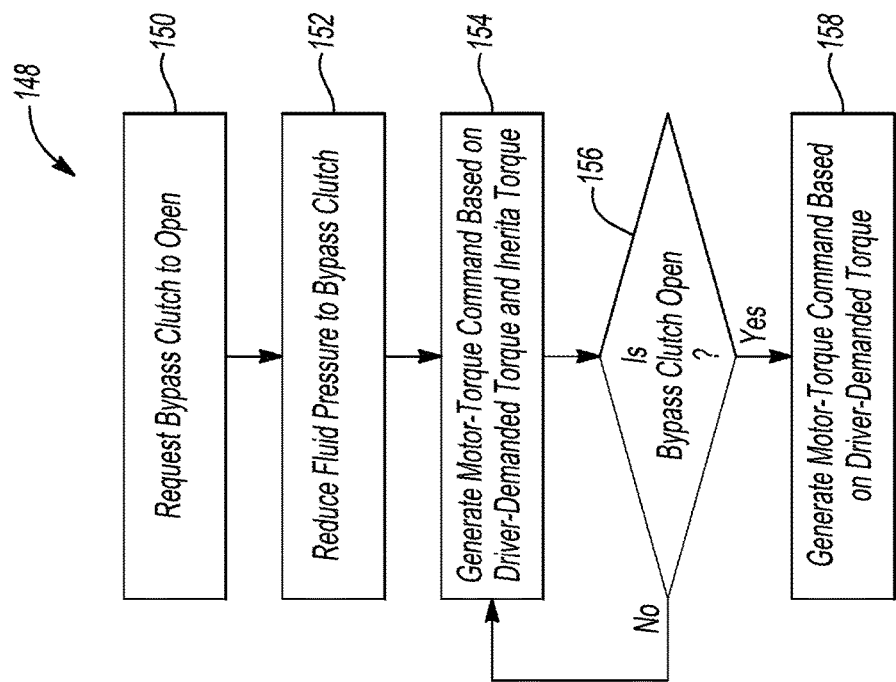
FIG. 5 shows a flow chart for operating the vehicle when the bypass clutch is being opened.

FIG. 5 illustrates a flow chart 148 of an algorithm for controlling the vehicle during opening of the bypass clutch. At operation 150 a request to open the bypass clutch is received by one or more control modules of the controller. The request to open the bypass clutch may be in response to the engine needing to start, hard acceleration of the vehicle, or a gear shift (upshift or downshift) At operation 152, the fluid pressure supplied to the bypass clutch is reduced decreasing the torque capacity of the bypass clutch. At operation 154, the controller generates a motor-torque command that is based on the driver-demanded torque and the inertia torque of the impeller. The torque commanded at operation 154 may be calculating using the controls 110 from FIG. 4. At operation 156 the controller determines if the bypass clutch is fully open. If no, control passes back to operation 154 and the controller continues to generate motor-torque commands based on both driver-demanded torque and inertia torque. If the bypass clutch is fully opened, control passes to operation 158 and the controller generates a motor-torque command based on driver-demanded torque without regard to the inertia torque.

Figure 6:
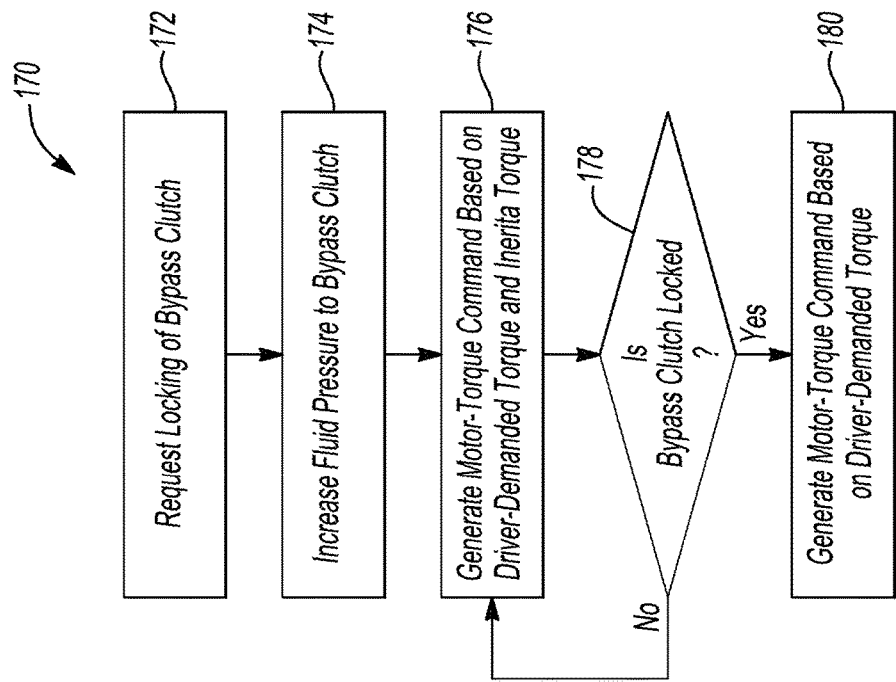
FIG. 6 shows a flow chart for operating the vehicle when the bypass clutch is being locked.

FIG. 6 illustrates a flow chart 170 of an algorithm for controlling the vehicle during locking of the bypass clutch. At operation 172, a request to lock the bypass clutch is received by one or more control modules of the controller. The request to lock the bypass clutch may be in response to the vehicle being at or near steady-state acceleration, the vehicle reaching a threshold temperature, the vehicle reaching a threshold vehicle speed or transmission gear, or the vehicle preparing for a regenerative braking event. At operation 174, the fluid pressure supplied to the bypass clutch is increased to increase the torque capacity of the bypass clutch. At operation 176, the controller generates a motor-torque command that is based on the driver-demanded torque and the inertia torque. The torque commanded at operation 176 may be calculating using the controls 110 from FIG. 4. At operation 178, the controller determines if the bypass clutch is locked. If no, control passes back to operation 176 and the controller continues to generate a motor-torque command based on both driver-demanded torque and inertia torque. If the bypass clutch is locked, control passes to operation 180 and the controller generates a motor torque command that is based on driver-demanded torque without regard to the inertia torque.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
an engine including a crankshaft;
a transmission including a torque converter having a turbine fixed to a turbine shaft that is driveably connected to driven wheels of the vehicle, the torque converter further having an impeller and a bypass clutch configured to selectively lock the impeller and the turbine relative to each other;
an electric machine including a rotor selectively coupled to the crankshaft via a disconnect clutch and fixed to the impeller; and
at least one controller configured to
generate a first torque command for the electric machine that defines a magnitude equal to driver-demanded torque while the bypass clutch is locked, and
in response to a reduction in fluid pressure supplied to the bypass clutch, generate a second torque command for the electric machine that defines a magnitude equal to driver-demanded torque plus impeller inertia torque.

2. The vehicle of claim 1, wherein the controller is further configured to generate a third torque command for the electric machine that defines a magnitude equal to a driver-demanded torque while the bypass clutch is open or slipping, and in response to an increase in fluid pressure supplied to the bypass clutch, generate a fourth torque command for the electric machine that defines a magnitude equal to driver-demanded torque minus impeller inertia torque.

3. The vehicle of claim 1, wherein the first torque command and the second torque command are adjacent in time to each other.

4. The vehicle of claim 1, wherein the driver-demanded torque during the first and second torque commands is a same value.

5. The vehicle of claim 1, wherein the inertia torque is based on an acceleration of the impeller during the reduction in fluid pressure and an inertia of the impeller.

6. The vehicle of claim 1, wherein the second torque command terminates in response to a fluid torque between the impeller and the turbine approximating the driver-demanded torque.

7. The vehicle of claim 6, wherein the controller is further configured to, in response to the fluid torque approximating the driver-demanded torque, generate a third torque command for the electric machine that defines a magnitude equal to the driver-demanded torque.

8. The vehicle of claim 1, where the magnitude of the second torque command is equal to the first torque command plus the impeller inertia torque.

9. A hybrid powertrain comprising:
an engine;
a motor selectively coupled to the engine;
a transmission including a torque converter having an impeller and a turbine selectively fixed via a bypass clutch; and
a controller configured to, in response to a reduction in torque capacity of the bypass clutch, increase a torque command to the motor by a magnitude equal to an inertia torque of the impeller during the reduction in torque capacity.

10. The hybrid powertrain of claim 9, wherein the controller is further configured to, in response to an increase in torque capacity of the bypass clutch, decrease the torque command to the motor by a magnitude equal to an inertia torque of the impeller during the increase in torque capacity.

11. The hybrid powertrain of claim 9, wherein the inertia torque is based on an acceleration of the impeller during the reduction in torque capacity and an inertia of the impeller.

12. The hybrid powertrain of claim 9, wherein the controller is further configured to, in response to the torque capacity of the bypass clutch being zero, reduce the torque command to the motor to a magnitude equal to a driver-demanded torque.

13. The hybrid powertrain of claim 9, wherein the inertia torque is based on a rate of change of the speed of the impeller.

14. The hybrid powertrain of claim 9 further comprising a disconnect clutch that selectively couples a crankshaft of the engine to a rotor of the motor.

15. The hybrid powertrain of claim 9, wherein the impeller is fixed to a crankshaft of the engine and the turbine is disposed on an input shaft of the transmission.

16. A method of controlling motor torque in a hybrid vehicle having an engine, a motor, and a torque converter with a bypass clutch that selectively locks an impeller to a turbine, the method comprising:
generating a motor torque at a first magnitude when the bypass clutch is locked; and
in response to a decrease in torque capacity of the bypass clutch, generating a motor torque at a second magnitude until the torque capacity approximates zero, wherein the difference between the second magnitude and the first magnitude approximates an inertia torque of the impeller during the decrease in torque capacity.

17. The method of claim 16 further comprising:
generating a motor torque at a third magnitude when the bypass clutch is open or slipping; and
in response to an increase in torque capacity of the bypass clutch, generating a motor torque at a fourth magnitude until the torque capacity approximates a driver-demanded torque, wherein the difference between the third magnitude and the fourth magnitude approximates an inertia torque of the impeller during the increase in torque capacity.

18. The method of claim 16 further comprising generating a command to start the engine, wherein the decrease in torque capacity is in response to the command to start the engine.

19. The method of claim 16, wherein the inertia torque is based on an acceleration of the impeller during the decrease in torque capacity and an inertia of the impeller.

20. The method of claim 16, wherein the engine and the motor are selectively coupled with a disconnect clutch, and further comprising closing the disconnect clutch in response to a request to start the engine, wherein the decrease in torque capacity is in response to the command to start the engine.

* * * * *